Figure 1:
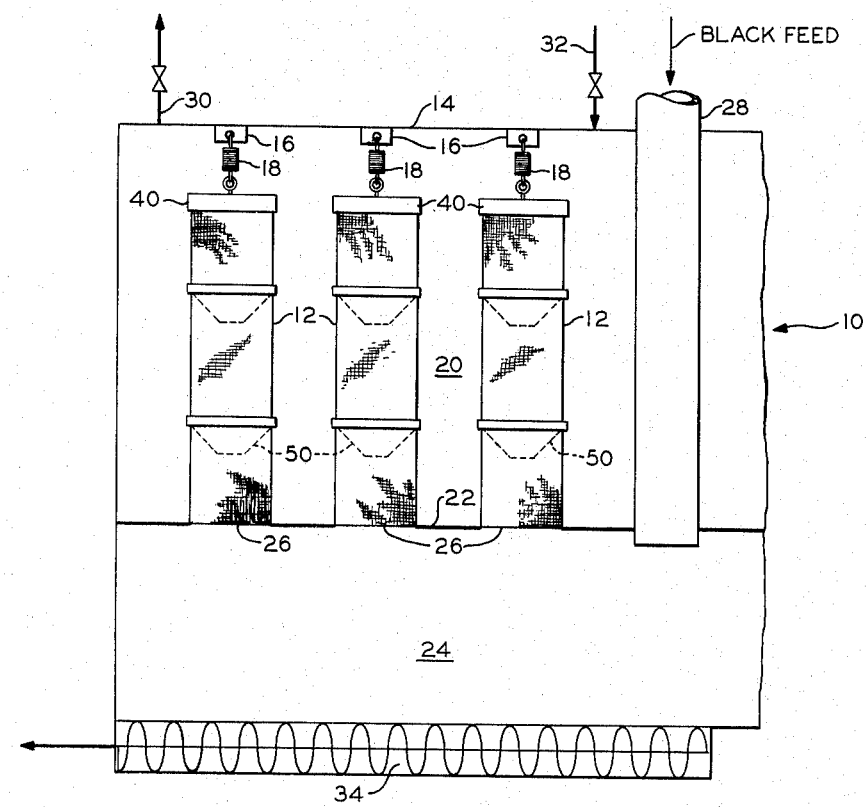

March 22, 1966  L. F. HANES  3,241,297
BAG FILTERING APPARATUS
Filed April 13, 1962

INVENTOR.
L. F. HANES
BY Young & Quigg
ATTORNEYS

United States Patent Office 3,241,297
Patented Mar. 22, 1966

3,241,297
BAG FILTERING APPARATUS
Lewis F. Hanes, Bartlesville, Okla., assignor to Phillips Petroleum Company, a corporation of Delaware
Filed Apr. 13, 1962, Ser. No. 187,385
7 Claims. (Cl. 55—302)

This invention relates to an apparatus for recovering particulate solids from gases in which they are entrained. A specific aspect of the invention is concerned with an apparatus for filtering carbon black from the effluent from a carbon black furnace.

The recovery of solids from a suspension of finely divided solids in gases is conventionally effected in a bag filter which comprises a series of upright porous bags thru which the gaseous suspension is passed, leaving a portion of the finely divided solids on the walls of the bags and causing a portion to fall into a subjacent collecting zone. The bags are made of woven material which withstands the conditions required by the specific application. In filtering carbon black from the smoke or effluent gas from a carbon black reactor, the bags are usually fabricated of fiber glass for strength and heat resistance, but other materials such as "Orlon" have been utilized. In this type of filtering, the "pores" of the bag become plugged to such an extent that the pressure drop across the bags becomes excessive and it is necessary to mechanically or sonically vibrate the bags while reversing the flow of gas thru the bags in order to dislodge the black particles adhering to the bags.

A filtering process and apparatus are disclosed in U.S. patent application S.N. 144,911, filed October 13, 1961, in which relatively large sized bags are utilized with a ring, holding the bag in expanded position, positioned approximately at the upper level of the lower one-fifth of the bag (the bag being 25 feet long and the ring being 5 feet from the lower end). It has been observed in operation with this type of bag employing a ring holding the bag in expanded position in the lower section thereof that when repressuring the bag after back flowing same to remove solids adhering to the wall thereof, the upper section of the bag above the ring substantially completely collapses with the cross section thereof in the form of a 3- or 4-pointed star. When repressuring the interior of the bag after back-flowing, the initial rush of gas passes up the bag in the shape of a bubble and when this bubble reaches the top of the bag the whole bag pops open violently. This popping of the bag places unnecessary strain on the bag and results in breaking of the bag material adjacent the seam near the top of the bag before the end of the expected life of the bag. One method of curing the difficulty lies in the use of more rings in the bag as suggested in the above-identified application. This invention is concerned with another means for preventing bag popping and unnecessary deterioration of the bag.

Accordingly, it is an object of the invention to provide an improved apparatus for filtering solids from a gaseous suspension thereof. Another object is to provide a simple and positive means for preventing bag popping and undue strain on the filter bags in a bag filtering process and apparatus. A further object is to provide a device in a bag filter for preventing bag popping, which device maintains itself relatively free of solids. Other objects of the invention will become apparent to one skilled in the art upon consideration of the accompanying disclosure.

A broad aspect of the invention comprises a partition in a bag filter having an orifice therein the partition being positioned intermediate the ends of the bag and spaced substantially therefrom. The orifice in the partition restricts the flow of gas during the repressuring step so as to prevent bag popping but does not unduly interfere with the flow of gas into the bag. A preferred location of the partition, when utilizing a bag with a ring therein positioned in the lower section thereof, is adjacent the ring. More than one partition may be utilized in the bag to more gradually reestablish pressure in all sections of the bag. The area of the orifice in the partition is in the range of about 5 to 55 percent, and, preferably, 8 to 20 percent of the transverse cross-sectional area of the bag. The orifice may take substantially any configuration such as a circle, a polygon, a star, an ellipse, etc., the important function being its choke effect.

Processwise, the invention comprises choking the flow of gas from the bottom of the filter bag to the top thereof during repressuring after the back-flowing step so as to avoid violent popping of the bag.

Figure 2:
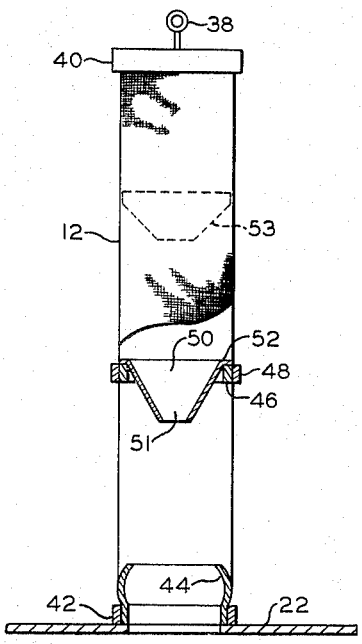
Figure 3:
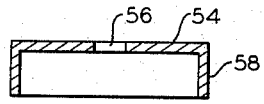
Figure 4:
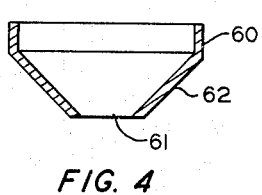
Figure 5:
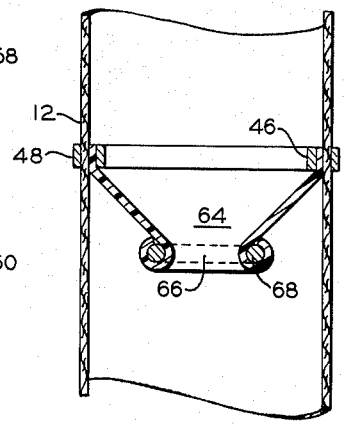

A more complete understanding of the invention may be had by reference to the accompanying drawing of which FIGURE 1 is a fragmentary elevational view in partial section showing a portion of a bag filter utilizing bags in accordance with the invention; FIGURE 2 is an elevational view in partial section of a filter bag equipped with a ring and partition in accordance with the invention; FIGURES 3 and 4 are vertical sections of other embodiments of the partition; and FIGURE 5 is a fragmentary vertical section of a filter bag having a ring and flexible partition therein.

Referring to FIGURE 1 a bag filter unit 10 (shown in more detail in U.S. Patent 2,878,978, issued to G. J. Webster and N. R. Wilson) is provided with a plurality of filtering compartments each containing several filter bags 12. These bags are suspended from the roof 14 of the unit by supports 16 and flexible linkage 18. The upper compartment 20 of the unit above partition 22 is open to the lower compartment 24 only thru openings 26 which lead into filter bags 12. An inlet 28 for the gaseous suspension to be freed of its solids is axially positioned so as to deliver the gaseous solids suspension below partition 22 from which the gas containing particulate solids passes upwardly and laterally thru bags 12 into compartment 20 from which the gas is vented thru line 30. During backpressuring the flow of gas thru line 30 is cut off and pressuring gas is injected thru line 32 so as to pass thru bags 12 and into compartment 24. In some applications of the process, bags 12 are vibrated during backpressuring. After a short backpressuring period, the flow of gas thru line 32 is cut off and line 30 is open to flow so as to allow gas from compartment 24 to refill or repressure bags 12 and continue the filtering operation. The solids removed from the gas by the bags drops into compartment 24 and is transferred by a rotary scraper (not shown) into conveyor 34 for removal from the unit. The various compartments in filter unit 10 are backpressured sequentially so that only one is on backpressuring to clean the bags at any given time.

Referring to FIGURE 2 filter bag 12 is suspended in upright position by ring 38 attached to cap 40. The lower end of the bag is fastened by ring clamp 42 to upright annular flange 44 attached directly to partition 22 of the filter unit. A ring 46 is clamped to the bag by ring clamp 48 (which may be similar to a radiator hose clamp). Partition 50 is fabricated in the form of an inverted truncated cone with an orifice 51 at the apex and a radially extending flange 52 at its base which projects over ring 46. Partition 50 is attached to ring 46 by screws or bolts (not shown) or it may be attached thereto by other means such as spot welding in the event this partition and ring are fabricated of metal. A second partition 53 may be positioned in bag 12 substantially half way between partition 50 and cap 40.

The embodiment of partition 50 designated 54 and shown in FIGURE 3 comprises a disc with an orifice 56 therein, the disc and ring 58 being integral. This element shown in FIGURE 3 is clamped in place at the desired location in bag 12 by means of a clamp such as clamp 48 of FIGURE 1.

FIGURE 4 shows an integral partition and ring 60 having an orifice 61 formed by conical section 62.

In FIGURE 5 bag 12 is provided with a ring 46 and and clamp 48, as in FIGURE 2, but partition 64 is constructed of flexible material, such as woven fiber glass or similar material which withstands the conditions required in the filtering application. In filtering carbon black, material must be utilized which withstands temperatures of 400 to 450° F. The orifice 66 in partition 64 is formed around a ring 68 to assure that the orifice remains open at all times. Partition 64 may be applied directly to the inside wall of the filter bag by stitching, riveting, or other means without the use of a ring and clamping device as illustrated at 53 in FIGURE 2.

In operation, in a given time cycle when the inner walls of filter bag 12 become partially plugged with fine solids, the flow of gas into the mouth of bags 12 from compartment 24 is terminated in a selected compartment 20 by closing the valve in line 30. Bags 12 are then vibrated by horns or other means (not shown) and the valve in line 32 is opened so as to force gas thru the walls of the bags and into compartment 24, thereby dislodging adhering particles of carbon black or other solids from the bags and carrying the solids into compartment 24 for recovery. At the end of the backpressuring phase of the cycle of operation, the valve in line 32 is closed to cut off the flow of backpressuring gas and the valve in line 30 is opened to repressure the filter bags with solids-containing gas from compartment 24.

During the back flow of gas thru filter bags 12, the section of the bag above partition 50 tends to collapse into a 3 or 4 point star (transverse cross section) and upon repressuring with gas from compartment 24, partition 50 prevents the rush of gas upwardly thru the filter bag, merely allowing the gas to fill this portion of the bag more gradually and avoid violent popping of the bag.

To illustrate the invention, reference is now made to a test of the effect of the partition and orifice of the invention in preventing bag popping. In the test, fiber glass bag 25' long and 12" in diameter, with a ring and partition similar to that of FIGURE 2 was operated on a standard cycle of filtering, backflowing, and repressuring (on stream). The orifice diameter was 3 inches. The filtering pressure was in the range of 8" to 14" of water, while the backflow pressure was in the range of 5" to 6" of water. The valves controlling flow of gas, both feed gas and backpressuring gas, were quick opening valves. During backflow the bag above the orifice collapsed in a 3 or 4 point star. In each repressuring phase of the cycle, it was observed that the section of bag above the partition and orifice inflated gradually over a 3 to 4 second period and there was no popping or violent movement of the bag at any time during the cycle. No gas bubble could be detected as was the case when the orifice or partition was not in place in the bag.

The time required for opening the bag during repressuring can be controlled by adjusting the size of the orifice. For instance, by increasing the size of the orifice a shorter period for filling the upper section of the bag (above the orifice) is required. If the orifice used is too large, the desired choking effect is lost and bag popping results. The maximum ratio of the orifice area to the area of the transverse area of the bag depends upon a number of factors including the length of the bag, the bag diameter, the material from which the bag is fabricated and the position of the orifice in the bag. It is generally essential to size the orifice so that it reduces the gas flow at least 45 percent and, preferably, 60 percent or more. The ideal condition is an orifice of such diameter that the bag fills in a minimum of time without popping, i.e., about 2 seconds. This means that the area of the orifice should be not more than about 55 percent of the area of the transverse cross section of the bag and is preferably less than 40 percent of this area. In the above test, the orifice area was about 6.26 percent of the bag area. An orifice area of less than about 5 percent of the bag area is undesirable because of the time delay involved in filling the upper section of the bag.

Certain modifications of the invention will become apparent to those skilled in the art and the illustrative details disclosed are not to be construed as imposing unnecessary limitations on the invention.

I claim:

1. In combination a porous elongated cylindrical filter bag formed of flexible material, having an open fixed bottom end and a closed suspended top end, said bag being in upright position with its closed end at the top; a transverse partition entirely within the lower half of said bag of relatively short vertical extent, spaced substantially from its lower end, the outer periphery of said partition being of substantially the same diameter as said bag; rigid ring means attaching the outer periphery of said partition to said bag; a choke in said partition consisting of an orifice having an area in the range of 5 to 55 percent of the cross sectional area of said bag, the choking effect of said choke preventing bag-popping during subsequent repressuring of the inside of the bag after backflow into the bag thru the walls thereof to remove solids.

2. The filter bag of claim 1 wherein said partition and said orifice are at a level about ⅓ of the distance up the bag from its bottom end.

3. A filtering apparatus comprising in combination:
   (1) a filter housing including an upper filtering compartment, a lower collecting compartment, a floor separating the aforesaid compartments, a gas-solids inlet to and a solids outlet from said lower compartment, and a clean gas outlet and a clean gas inlet to said upper compartment; and
   (2) a plurality of filter bags of the structure of claim 1 in said upper compartment suspended from the top thereof and communicating with said lower compartment thru openings in said floor, said openings being sealed to the lower end of said bags to provide flow from one compartment to the other only thru said bags.

4. The bag of claim 1 wherein said ring and said partition are integral.

5. The bag of claim 1 wherein said partition is fabricated of flexible material.

6. The bag of claim 1 wherein the area of said orifice is in the range of 8 to 20 percent of the transverse cross sectional area of said bag.

7. In combination a porous elongated cylindrical filter bag formed of flexible material, having an open fixed bottom end and a closed suspended top end, said bag being in upright position with its closed end at the top; a plurality of transverse partitions entirely in said bag of relatively short vertical extent spaced apart and substantially from the ends of said bag, the outer periphery of said partitions being of substantially the same diameter as said bag; rigid ring means attaching the outer periphery of said partitions to said bag; a choke in each said partition consisting of an orifice having an area in the range of 5 to 55 percent of the cross sectional area of said bag; means for backflowing clean gas thru the walls of said bag and out the open end thereof; and means for repressuring the inside of said bag with particle-laden gas, the choking effect of said chokes preventing bag-popping during repressuring following backflowing.

References Cited by the Examiner

UNITED STATES PATENTS

| 735,904 | 8/1903 | Picher et al. | 55—368 |
| 877,580 | 1/1908 | Mestitz | 55—296 |
| 1,053,661 | 2/1913 | Smith | 55—492 |

(Other references on following page)

UNITED STATES PATENTS

| | | | |
|---|---|---|---|
| 1,448,322 | 3/1923 | Wirls | 55—364 |
| 1,843,639 | 2/1932 | Hansen | 55—341 X |
| 1,969,261 | 8/1934 | Eiben | 55—381 |
| 2,067,439 | 1/1937 | Dooley | 55—341 X |
| 2,215,282 | 9/1940 | Williams | 55—378 |
| 2,335,315 | 11/1943 | Seymour | 55—341 X |
| 2,769,506 | 11/1956 | Abboud | 55—292 |
| 2,845,140 | 7/1958 | Luhr | 55—496 |
| 2,871,978 | 2/1959 | Webster et al. | 55—341 |
| 3,073,097 | 1/1963 | Hallett et al. | 55—302 |
| 3,097,939 | 7/1963 | Schneider et al. | 55—304 |

OTHER REFERENCES

American Petroleum Institute, The Removal of Particulate Matter From Gaseous Wastes Filtration, page 28, Feb. 28, 1962, TP 242 C52.

REUBEN FRIEDMAN, *Primary Examiner.*